United States Patent
Maniktala

(10) Patent No.: US 10,923,952 B2
(45) Date of Patent: Feb. 16, 2021

(54) SECONDARY-SIDE OUTPUT BOOST TECHNIQUE IN POWER CONVERTERS AND WIRELESS POWER TRANSFER SYSTEMS

(71) Applicant: ChargEdge Inc., Fremont, CA (US)

(72) Inventor: Sanjaya Maniktala, Fremont, CA (US)

(73) Assignee: CHARGEDGE, INC., Fremont, CA (US)

( * ) Notice: Subject to any disclaimer, the term of this patent is extended or adjusted under 35 U.S.C. 154(b) by 69 days.

(21) Appl. No.: 15/082,703

(22) Filed: Mar. 28, 2016

(65) Prior Publication Data
US 2016/0294221 A1 Oct. 6, 2016

Related U.S. Application Data

(60) Provisional application No. 62/143,139, filed on Apr. 5, 2015.

(51) Int. Cl.
*H01F 27/42* (2006.01)
*H02J 50/12* (2016.01)

(52) U.S. Cl.
CPC .................................. *H02J 50/12* (2016.02)

(58) Field of Classification Search
CPC . H02J 5/005; H02J 7/025; H02J 17/00; H01F 38/14; B60L 11/182
USPC .......................................... 307/104; 363/17
See application file for complete search history.

(56) References Cited

U.S. PATENT DOCUMENTS

| | | | |
|---|---|---|---|
| 6,137,700 A * | 10/2000 | Iida ..................... | H02M 1/4208 323/282 |
| 6,212,430 B1 | 4/2001 | Kung | |
| 6,934,167 B2 * | 8/2005 | Jang ....................... | H02J 5/005 363/21.02 |
| 7,379,309 B2 * | 5/2008 | Isurin ..................... | H02M 1/36 363/17 |
| 8,183,827 B2 * | 5/2012 | Lyon ...................... | H02J 7/025 320/108 |
| 9,276,437 B2 | 3/2016 | Partovi et al. | |
| 2001/0054881 A1 * | 12/2001 | Watanabe ............. | H02J 7/0065 320/166 |

(Continued)

FOREIGN PATENT DOCUMENTS

WO    WO3013122483 A1    8/2013

OTHER PUBLICATIONS

Wireless Power Consortium, "Qi System Description Wireless Power Transfer," vol. I: Low Power, Part 1: Interface Definition, Version 1.1.2, Jun. 2013.

(Continued)

*Primary Examiner* — Quan Tra
(74) *Attorney, Agent, or Firm* — White & Case LLP

(57) ABSTRACT

In one embodiment, a power converter includes a wireless transmitter coil and a resonant capacitor that is configured to resonate at a first frequency. The wireless transmitter coil and resonant capacitor are configured to receive an alternating current at a second frequency such that the power converter outputs a first voltage that is dependent on the second frequency. In one embodiment, the first and second frequency are substantially equal. The power converter may also include an interconnection link configured to substantially double or vary the first voltage depending on a duty cycle that is applied to the interconnection link.

19 Claims, 15 Drawing Sheets

(56) References Cited

U.S. PATENT DOCUMENTS

| | | | |
|---|---|---|---|
| 2009/0096413 A1 | 4/2009 | Partovi et al. | |
| 2010/0008107 A1* | 1/2010 | Mallwitz | H02M 3/33576 363/21.02 |
| 2010/0259217 A1 | 10/2010 | Baarman et al. | |
| 2011/0309874 A1* | 12/2011 | Takimoto | H03K 17/063 327/427 |
| 2012/0230067 A1* | 9/2012 | Yamanaka | H02M 5/293 363/37 |
| 2013/0093252 A1 | 4/2013 | Norconk et al. | |
| 2013/0336013 A1* | 12/2013 | Mueller | H02M 3/33569 363/17 |
| 2014/0070622 A1 | 3/2014 | Qualcomm Inc | |
| 2014/0119060 A1* | 5/2014 | Zhu | H02M 1/10 363/17 |
| 2014/0232330 A1 | 8/2014 | Robertson et al. | |
| 2015/0295416 A1 | 10/2015 | Li | |
| 2015/0333634 A1* | 11/2015 | Yoshida | H02M 3/33576 363/21.03 |
| 2016/0013663 A1* | 1/2016 | Zhang | H02J 50/12 307/104 |
| 2018/0090995 A1* | 3/2018 | Arasaki | H02J 50/12 |

OTHER PUBLICATIONS

Maniktala, S., "Fixing EMI across the Board," EE Times, Nov. 5, 2003, http://www.eetimes.com/document.asp? doc_id=1230444.

Maniktala, S., "More on Designing Reliable Electronic Ballasts," EE Times, Apr. 20, 2005, http://www.eetimes.com/document.asp? doc_id=1272231.

Maniktala, S. "The Confluence of Resonant Switching Topologies and Wireless Charging," presented at ISSCC 2015, San Francisco, CA, Feb. 26, 2015.

Maniktala, S., "WPT Breaks All Connections, Part 1," EDN Network, Mar. 9, 2015, http://www.edn.com/design/power-management/4438850/WPT-breaks-all-connections—Part-1.

Maniktala, S., "WPT Breaks All Connections, Part 2," EDN Network, Mar. 14, 2015, http://www.edn.com/design/power-management/4438924/WPT-breaks-all-connections—Part-2.

Maniktala, S., "WPT Breaks All Connections, Part 3," EDN Network, Apr. 6, 2015, http://www.edn.com/design/power-management/4439125/WPT-breaks-all-connections—Part-3.

Power Matters Alliance, "PMA Inductive Wireless Power and Charging Transmitter Specification—System Release 1," PMA-TS-0003-0 v2.00, Apr. 24, 2014.

Power Matters Alliance, "PMA Inductive Wireless Power and Charging Receiver Specification—System Release 1," PMA-TS-0001-0 v1.00, Nov. 16, 2013.

"Notification of Transmittal of the International Search Report and the Written Opinion of the International Searching Authority," Int'l Appl. No. PCT/US2016/024483, dated Jun. 20, 2016.

* cited by examiner

SECONDARY-SIDE OUTPUT BOOST TECHNIQUE IN POWER CONVERTERS AND WIRELESS POWER TRANSFER SYSTEMS

CROSS-REFERENCE TO RELATED APPLICATION

This application claims the benefit of and incorporates by reference in its entirety U.S. Provisional Patent Application No. 62/143,139 entitled "Secondary-Side Output Boost or Buck Techniques in Power Converters and Wireless Power Transfer Systems," filed on Apr. 5, 2015.

FIELD OF THE INVENTION

The invention relates generally to wireless power transfer and more particularly to dynamically adjusting output voltage of a secondary-side power stage for use in power converters or wireless power transfer systems.

BACKGROUND

Electronic devices typically require a connected (wired) power source to operate, for example, battery power or a wired connection to a direct current ("DC") or alternating current ("AC") power source. Similarly, rechargeable battery-powered electronic devices are typically charged using a wired power-supply that connects the electronic device to a DC or AC power source. The limitation of these devices is the need to directly connect the device to a power source using wires.

Wireless power transfer (WPT) systems typically use time-varying magnetic fields and the principle of magnetic induction or magnetic resonant induction to transfer power wirelessly. In accordance with Faraday's Law, a time-varying current applied to a transmitter coil produces a magnetic field that will induce a voltage in a receiver coil that is in close proximity to the transmitter coil. The induced voltage in the receiver coil is typically rectified and filtered to produce a substantially direct current (DC) voltage that can provide power to an electronic device or a rechargeable battery. Such wireless power transfer systems may use magnetic induction or magnetic resonant induction techniques, both of which emit magnetic flux in the "near-field." Such near-field techniques are capable of transferring power only when the transmitter coil and the receiver coil are within a short distance from one another, typically on the order of a few centimeters or less.

The Wireless Power Consortium (WPC) was established in 2008 to develop the Qi inductive power standard for charging and powering electronic devices. Powermat is another well-known standard for WPT developed by the Power Matters Alliance (PMA). The Qi and Powermat near-field standards operate in the frequency band of 100-400 kHz. The problem with near-field WPT technology is that typically only 5 Watts of power can be transferred over the short distance of 2 to 5 millimeters between a power source and an electronic device, though there are ongoing efforts to increase the power. For example, some concurrently developing standards achieve this by operating at much higher frequencies, such as 6.78 MHz or 13.56 MHz. Though they are called magnetic resonance methods instead of magnetic induction, they are based on the same underlying physics of magnetic induction. There also have been some market consolidation efforts to unite into larger organizations, such as the AirFuel Alliance consisting of PMA and the Rezence standard from the Alliance For Wireless Power (A4WP), but the technical aspects have remained largely unchanged.

Wireless power transfer systems (and power converters) typically utilize a secondary-side power stage with rectification and filtering. Secondary-side power stages may be used in power converters such as the half-bridge and full-bridge converters and in semi- or quasi-resonant topologies such as the zero voltage switched (ZVS) phase shifted full-bridge topology. Such converters typically rely on pulse-width modulation for regulating or varying the output.

A prior art power converter may include a primary side having a primary coil and DC blocking capacitor. The basic purpose of the primary side of the power converter is to apply an alternating voltage across the combination of the primary coil and DC blocking capacitor. The purpose of the DC blocking capacitor is to eventually charge up to an almost steady DC value (automatically by charge balance), and prevent any net DC voltage or net volt-seconds from being applied to the primary coil. The DC blocking capacitor is an optional element and can often be omitted in converters, such as when the converter is in a full-bridge configuration, when the primary coil is driven symmetrically with no starting DC offset, such that there is no need to block any net DC voltage. The prior art converter may also include a core, a secondary side having a secondary coil, and an output capacitor. The core may be made of a magnetic material, such as ferrite. The secondary side may also include a full-bridge rectifier having field effect transistors (FETs) across the diodes. The FETs of the rectifier are switched "synchronously," such that each diode conducts only when it is in parallel to the respective FETs. The purpose of the FETs is only to reduce the dissipation occurring due to the non-zero forward voltage drop of diodes. When the voltage across the secondary coil flips back and forth, there is a steady DC voltage of "+V" on an output rail of the secondary side of the power converter. In a traditional system, this voltage is directly related to one or more of: the input DC rail magnitude that is applied to the primary coil, the duty cycle of the applied signal, and the turns ratio between the primary and secondary coils. However, the voltage does not depend directly on the switching frequency.

One variation of the prior art converter described above is a voltage doubler circuit whereby the output capacitor of a conventional converter is split into two separate capacitors, where each gets charged or "topped off" during one or more alternate half-cycles of the applied alternating voltage. This modification results in doubling the output voltage, "+2V." This voltage doubler circuit may be applied to traditional/classical power converters and semi-resonant power converters such as the zero-voltage switched (ZVS) phase shifted full-bridge.

The voltage doubler principle described above has not been utilized within wireless power transfer systems and to true resonant converters such as LLC converters. Another drawback to conventional power converters is that the output voltage is static, for example only a first voltage (e.g., V) or only a second voltage that is double the first voltage (e.g., "+2V"); in other words, the output voltage cannot be changed. There is therefore an unmet need in wireless power transfer systems and true resonant converters to be able to dynamically vary the voltage output of a power converter.

SUMMARY

In one embodiment, a power converter includes a first coil and a resonant capacitor that is configured to resonate at a first frequency. The first coil and resonant capacitor are configured to receive an alternating current at a second frequency such that the power converter outputs a first voltage that is dependent on the second frequency. In one embodiment, the first and second frequency are substantially equal. The power converter may also include an interconnection link configured to substantially double or vary the first voltage depending on a duty cycle that is applied to the interconnection link.

In another embodiment, power converter includes a wireless power receiver, where the wireless power receiver includes a coil, a first capacitor coupled to a first end of the coil, a field effect transistor ("FET") coupled to the first capacitor, at least one rectifier, and a second capacitor coupled to the at least one rectifier. The FET and first capacitor are configured to act as a charge-pump for the second capacitor by switching the FET ON and OFF according to a duty cycle, such that the FET and the first capacitor charge the second capacitor.

DETAILED DESCRIPTION

Figure 1A:
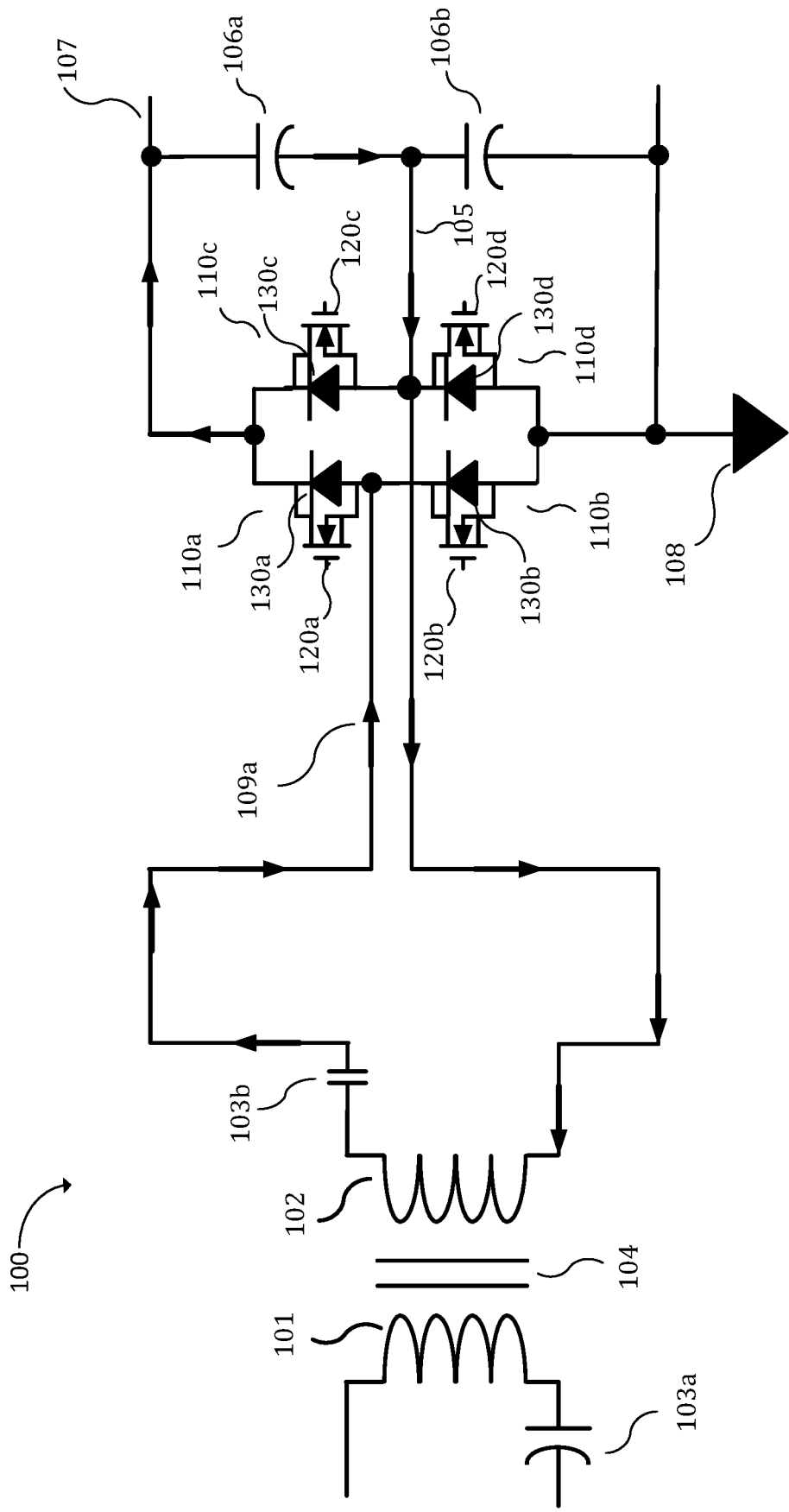
FIG. 1A is a diagram of one embodiment of a power converter with a resonant capacitor and having a direction of current flow, according to the invention.

FIG. 1A is a diagram of one embodiment of a power converter 100 with a resonant capacitor 103a located at a primary side of power converter 100, according to the invention. Power converter 100 includes, but is not limited to, a primary side having a first coil 101 and resonant capacitor 103a, a core 104, and a secondary side having a second coil 102, a second capacitor 103b, an interconnecting link 105, a first output capacitor 106a, a second output capacitor 106b, an output voltage rail 107, a ground 108 (output voltages of power converter 100 are stated in relation to ground 108), and a first rectifier 110a, a second rectifier 110b, a third rectifier 110c, and a fourth rectifier 110d. First coil 101 may be implemented as a primary-side coil of a true resonant converter (such as an LLC power converter, where "LLC" represents a combination of two inductors "L" and one capacitor "C"), or as a transmitter coil within a wireless power transfer system; the primary side of power converter 100 therefore represents the wireless transmitter when power converter 100 is implemented within a wireless power transfer system. Not shown in FIG. 1A is an alternating current source which supplies an alternating voltage across the combination of first coil 101 and resonant capacitor 103a. Unlike traditional power converters as discussed above which employ a DC blocking capacitor in the primary side of traditional converters, resonant capacitor 103a resonates with the inductance of first coil 101. In one embodiment, resonant capacitor 103a may resonate at a frequency substantially close to a frequency of the applied alternating voltage. Thereafter, by virtue of a peaking or gain of the resonance response curve, the output voltage at output voltage rail 107 (e.g., V) is controllable by varying the frequency of the alternating voltage applied across the combination of first coil 101 and resonant capacitor 103a. In one embodiment, the first output voltage at output voltage rail 107 depends on the frequency of the applied voltage. The frequency of the input voltage on the primary side determines the value of the first output voltage. The presence or activation of interconnecting link 105 results in a second output voltage that is substantially double the first output voltage. Second coil 102 may be implemented as a secondary-side coil or winding in a resonant power converter, or as a receiver coil in a wireless power transfer system. As such, the secondary side of power converter 100 may be implemented as a wireless receiver in a wireless power transfer system. Core 104 may be implemented as a core in a resonant power converter, or simply as air or plastic, within a wireless power transfer system. First and second rectifiers 110a and 110b may contain FETs 120a and 120b across each diode 130a and 130b, respectively, where FETs 120a and 120b are switched synchronously such that they are made to conduct only when each diode in parallel with the respective FETs are conducting. For example, in FIG. 1A only FET 120a is switched on because only diode 130a is conducting. Synchronously switching FETs 120a and 120b reduces the dissipation due to the non-zero forward voltage drop of diodes 130a and 130b. First and second output capacitors 106a and 106b respectively filter the output voltage at output voltage rail 107. Interconnection link 105 enables voltage doubling capability within power converter 100. In one embodiment, interconnection link 105 connects a point located between first output capacitor 106a and second output capacitor 106b to a second point located between third rectifier 110c and fourth rectifier 110d. The second point is also coupled to second coil 102. In another embodiment, third rectifier 110c, which comprises FET 120c and diode 130c, and fourth rectifier 110d, which comprises FET 120d and diode 130d, may be omitted and interconnection link 105 connects a point located between first output capacitor 106a and second output capacitor 106b directly to second coil 102. Current (as represented by arrows) 109a represent the direction of current flow when an upper end of second coil 102 has a voltage that goes high with respect to a lower end of second coil 102. Current 109a charges output capacitor 106a.

Figure 1B:
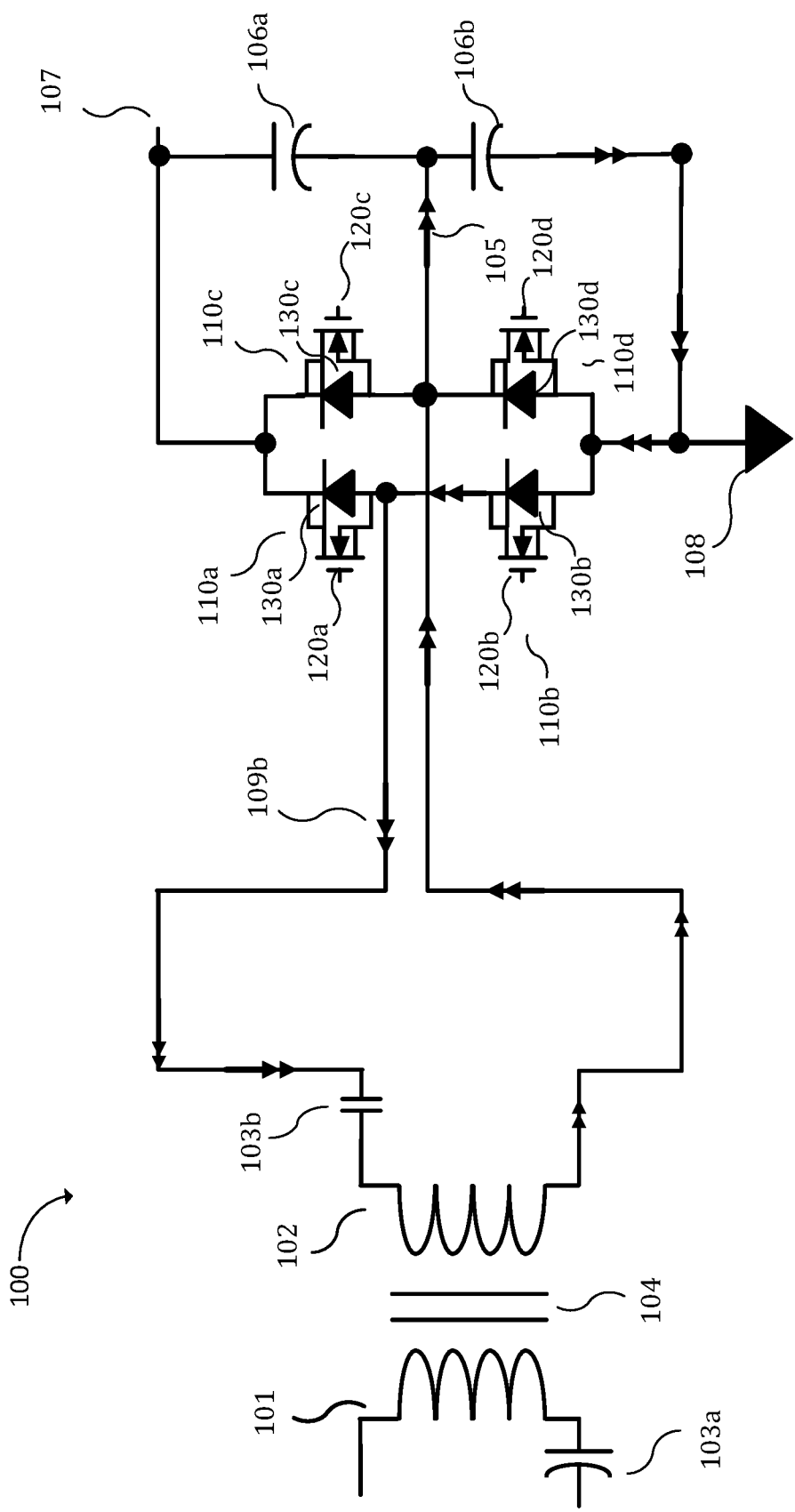
FIG. 1B is a diagram of the power converter of FIG. 1A illustrating a different direction of current flow, according to the invention.

FIG. 1B illustrates the same power converter 100 shown in FIG. 1A but having current 109b (as represented by double arrows) showing a different direction of current flow when the lower end of second coil 102 has a voltage that goes high with respect to the upper end of second coil 102. Diode 130b is conducting and current 109b flow charges output capacitor 106b.

By way of resonant capacitor 103a and interconnection link 105, the actual output voltage of power converter 100 is a function of the frequency of the applied voltage across resonant capacitor 103a and first coil 101. Second capacitor 103b is optional and in one embodiment is excluded from power converter 100. In one embodiment of the invention, power converter 100 has a first output voltage when interconnection link 105 is deactivated (or not present), and a second output voltage that is double the first output voltage when interconnection link 105 is activated (or present). Interconnection link 105 provides voltage double capability to power converter 100. In one embodiment, interconnection link 105 is a hardwired copper link.

Figure 2A:
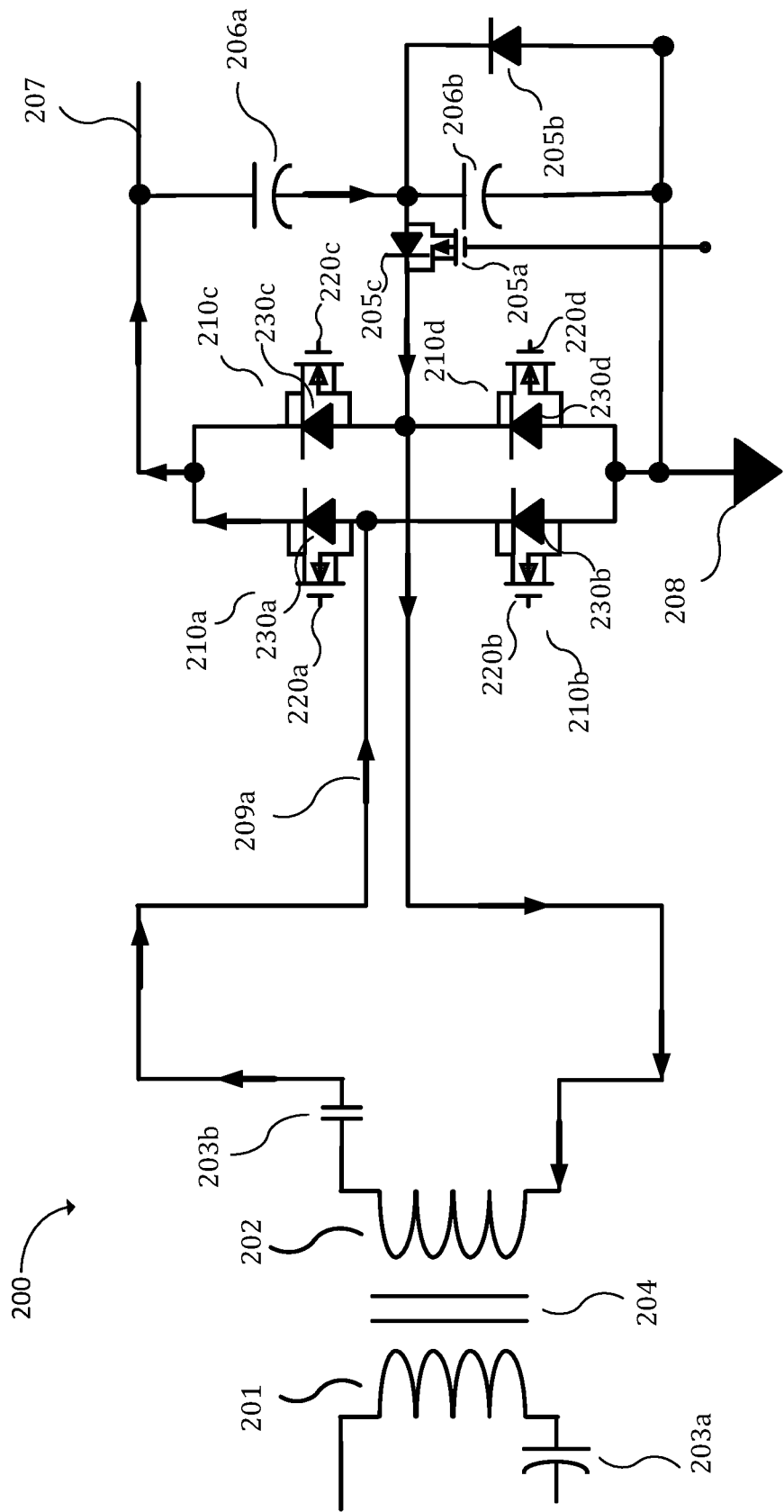
FIG. 2A is a diagram of another embodiment of a power converter with a resonant capacitor and having a direction of current flow, according to the invention.

FIG. 2A shows another embodiment of a power converter 200 having an interconnection link implemented as a switch or pulsed link having a diode 205b and a FET 205a with diode 205c, where FET 205a and diode 205b may be pulsed with a certain duty cycle (duty factor). FET 205a and diode 205b are implemented in the secondary side of power converter 200, which, in one embodiment, may be a wireless receiver when power converter 200 is implemented within a wireless power transfer system. In this embodiment, the output voltage at an output voltage rail 207 of power converter 200 dynamically varies between a first output voltage (e.g., V) and a second output voltage that is double the first output voltage (e.g., 2V), by changing the duty factor or duty cycle (ratio of ON time to the cycle time) of FET 205a and diode 205b. In one embodiment, by varying the duty cycle applied to FET 205a between 0 and 1 (i.e., fully OFF to fully ON), the output voltage of power converter 200 varies between the first output voltage and the second output voltage. Power converter 200 having FET 205a and diode 205b may be implemented in a wide variety of products including, but not limited to resonant power converters, wireless power systems, and traditional power converters.

In addition to FET 205a and diode 205b, power converter 200 includes, but is not limited to, a primary side having a first coil 201 and resonant capacitor 203a, a core 204, and a secondary side having a second coil 202, a second capacitor 203b, a first output capacitor 206a, a second output capacitor 206b, a ground 208, and a first rectifier 210a, a second rectifier 210b, a third rectifier 210c, and a fourth rectifier 210d. First coil 201 may be implemented as a primary-side coil of the true resonant converter (such as an LLC power converter), or as a transmitter coil within a wireless power transfer system; the primary side of power converter 200 therefore represents the wireless transmitter when power converter 200 is implemented within a wireless power transfer system. Not shown in FIG. 2A is an alternating current source which supplies an alternating voltage across the combination of first coil 201 and resonant capacitor 203a. Unlike traditional power converters as discussed above which employ a DC blocking capacitor in the primary side of traditional converters, resonant capacitor 203a resonates with the inductance of first coil 201. In one embodiment, resonant capacitor 203a may resonate at a frequency substantially close to a frequency of the applied alternating voltage. Thereafter, by virtue of a peaking or gain of the resonance response curve, the output voltage at output voltage rail 207 (e.g., V) is controllable by varying the frequency of the applied alternating voltage applied across the combination of first coil 201 and resonant capacitor 203a. Therefore, the value of output voltage at the output voltage rail 207 depends on the frequency of the applied voltage (on the primary side of power converter 200) and on the duty cycle applied to FET 205a. Second coil 202 may be implemented as a secondary-side coil or winding in a resonant power converter, or as a receiver coil in a wireless power transfer system. As such, the secondary side of power converter 200 may be implemented as a wireless receiver in a wireless power transfer system. Core 204 may be implemented as a core in a resonant power converter, or simply be air or plastic, within a wireless power transfer system. First and second rectifiers 210a and 210b may contain FETs 220a and 220b across each diode 230a and 230b, respectively, where FETs 220a and 220b are switched synchronously such that they are made to conduct only when each diode in parallel with the respective FETs are conducting. For example, in FIG. 2A only FET 220a is switched on because only diode 230a is conducting. Synchronously switching FETs 220a and 220b reduces the dissipation due to the non-zero forward voltage drop of diodes 230a and 230b. First and second output capacitors 206a and 206b, respectively filter the output voltage at the output voltage rail 207. FET 205a and diode 205b enable voltage doubling capability within power converter 200. In one embodiment, FET 205a and diode 205b connect a point located between first output capacitor 206a and second output capacitor 206b to a second point located between third rectifier 210c and fourth rectifier 210d, and second coil 202. In another embodiment, third rectifier 210c and fourth rectifier 210d may be omitted and FET 205a and diode 205b connect a point located between first output capacitor 206a and second output capacitor 206b directly to second coil 202. Arrows 209a represent the direction of current flow when a voltage at an upper end of second coil 202 goes high with respect to a lower end of second coil 202. Pulsing FET 205a with a certain duty cycle (duty factor) results in varying the output voltage of power converter 200 between the first voltage to the second voltage. In one embodiment, if the duty factor is 90, FET 205a is ON (conducting) for 90% of the time and the voltage across second output capacitor 206b will approach the first voltage, and the output voltage at output voltage rail 207 will approach the second voltage, which is substantially double the first voltage. In another embodiment, if the duty cycle is smaller, e.g., FET 205a is OFF for 95% of the time, the voltage across second output capacitor 206b will approach zero, so the output voltage will approach the first voltage (i.e., half the second voltage).

Diode 205b is necessary to protect second output capacitor 206b. If a load draws current from the output voltage at output voltage rail 207, the current in power converter 200 will flow in a reverse (discharge) direction across second output capacitor 206b. If second output capacitor 206b does not receive any charging current, it will eventually start to develop an uncontrolled negative voltage, which is harmful.

Figure 2B:
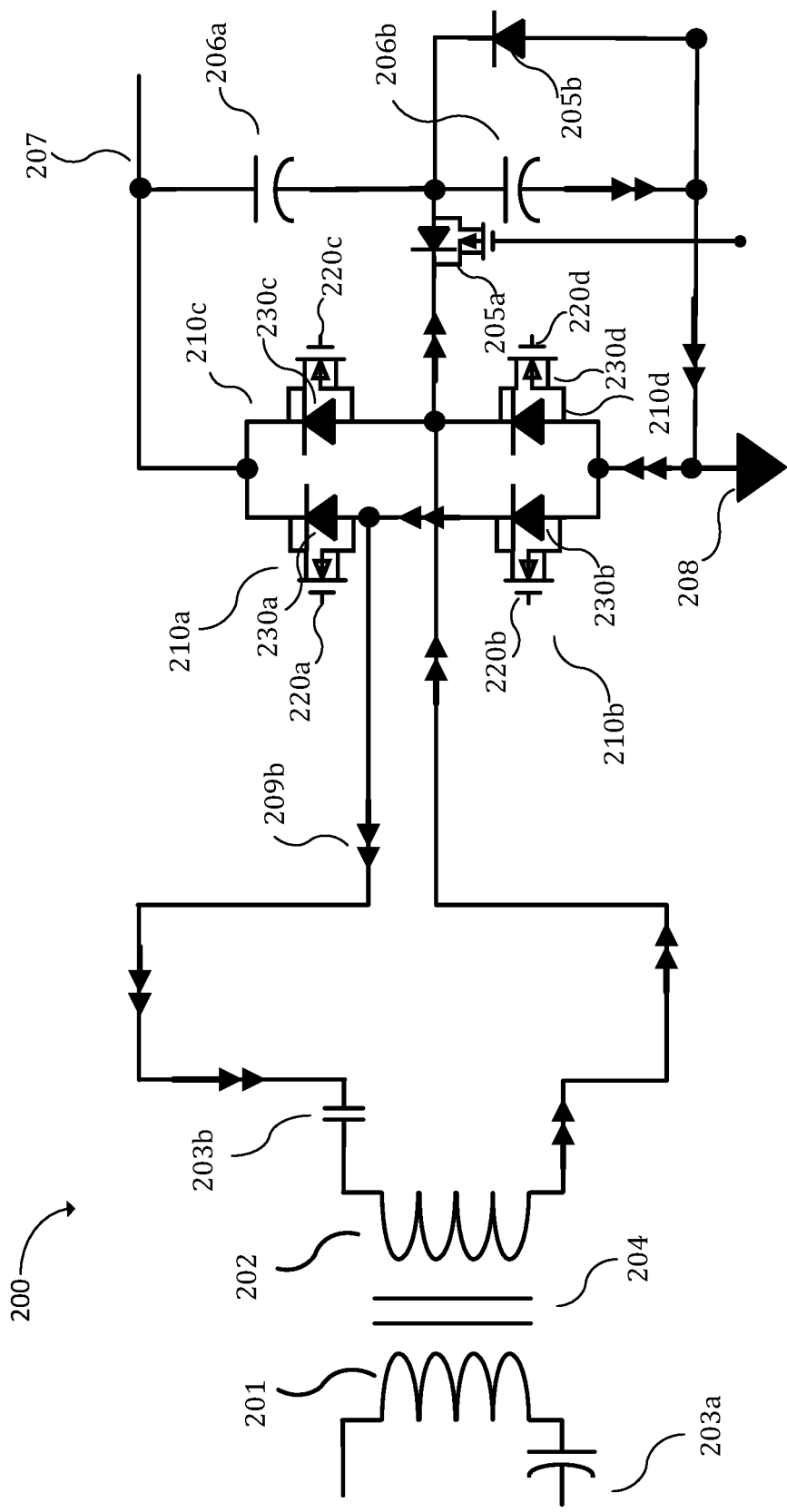
FIG. 2B is a diagram of the power converter of FIG. 2A illustrating a different direction of current flow, according to the invention.

FIG. 2B illustrates power converter 200 shown in FIG. 2A but with a different direction of current 209b flow as represented by arrows, when a voltage at the lower end of second coil 202 goes high with respect to the upper end of second coil 202.

Because the output voltage of power converter 200 is variable based on the frequency of the applied voltage, power converter 200 may be designed in a default state as a voltage output doubler. Lowering the duty cycle of FET 205a allows for reducing, stepping-down, or "bucking" the output voltage of power converter 200. It is important to note that the benefits of varying the output voltage are achieved without affecting the maximum available output current of power converter 200. Maximum power delivery across core 404 is greatly increased compared to prior-art techniques. Another benefit of being able to vary output voltage is the ability a receiver in a wireless power transfer system to self-regulate its own output. In this manner, multiple receivers may be placed on a single transmitting surface, and each receiver may independently regulate its own output without placing demands on a wireless transmitter as in traditional inductive wireless power systems.

Figure 3A:
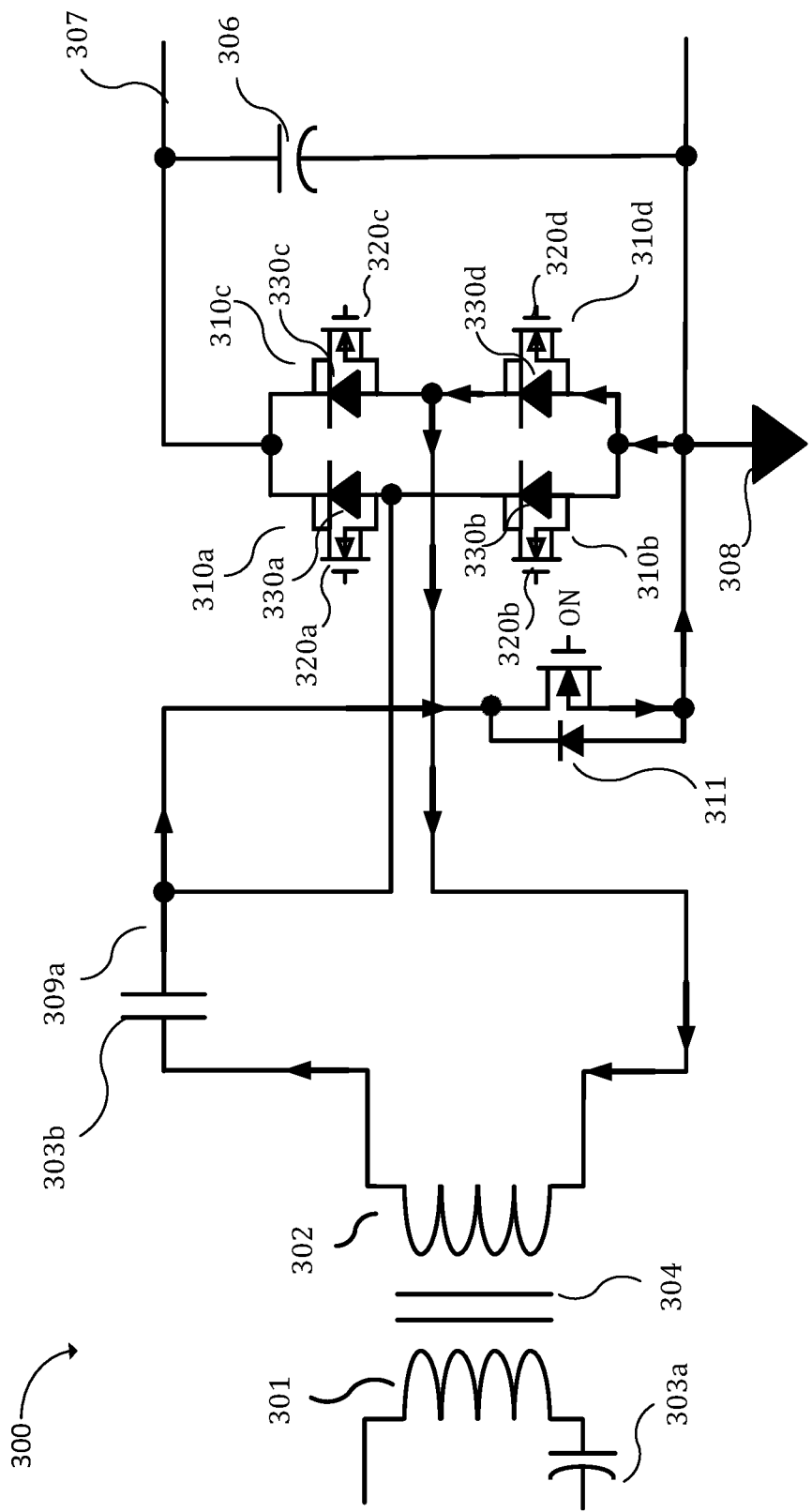
FIG. 3A is a diagram of another embodiment of a power converter with a charge pump and a direction of current flow, according to the invention.

FIG. 3A illustrates another embodiment of a power converter 300 having a charge pump implemented at the secondary side of power converter 300, according to the invention. Power converter 300 includes, but is not limited to, a primary side having a first coil 301 and a capacitor 303a, a core 304, and a secondary side having a second coil 302, a second capacitor 303b, an output capacitor 306, an output voltage rail 307, a ground 308, and a first rectifier 310a, a second rectifier 310b, a third rectifier 310c, a fourth rectifier 310d, and a FET 311. First coil 301 may be implemented as a primary-side coil of the true resonant converter (such as an LLC power converter, where "LLC" represents a combination of two inductors "L" and one capacitor "C"), or as a transmitter coil within a wireless power transfer system; the primary side of power converter 300 therefore represents the wireless transmitter when power converter 300 is implemented within a wireless power transfer system. First coil 301 is the primary-side coil of a converter, or the transmitter coil in a wireless power transfer system. Capacitor 303a may be a traditional DC blocking capacitor or a resonant capacitor as described above; in this embodiment capacitor 303a is optional. In this embodiment, the output voltage of power converter 300 is controlled by second capacitor 303b and FET 311 working in combination as a charge pump. Output voltage rail 307 may be controlled by various methods such as, but not limited to, varying the frequency of the applied alternating voltage applied across the combination of first coil 301 and capacitor 303a. Coil 302 may be a secondary-side coil or winding in a resonant or non-resonant power converter, or a receiver coil in a wireless power transfer system. As such, the secondary side of power converter 300 may be implemented as a wireless receiver in a wireless power transfer system.

Core 304 may be a core in a power converter, or air or plastic, in a wireless power transfer system. Output capacitor 306 has a larger capacitance than second capacitor 303b. First rectifier 310a, second rectifier 310b, third rectifier 310c, and fourth rectifier 310d may contain FETs 320a, 320b, 320c, and 320d, respectively, across each diode 330a, 330b, 330c, and 330d, respectively, where the FETs 320a, 320b, 320c, and 320d may be switched synchronously such that each FET is made to conduct only when the diode it is in parallel with conducts, to reduce the dissipation due to the non-zero forward voltage drop of the diodes. Output capacitor 306 filters an output voltage at output voltage rail 307. In this embodiment, second capacitor 303b is mandatory. The combination of FET 311 and second capacitor 303b operate as a charge pump for "charging" output capacitor 306. FET 311 can be ON (conducting) or OFF (non-conducting). Together, capacitor 303b and FET 311 create a boost action to vary or double an output voltage of power converter 300.

Figure 3B:
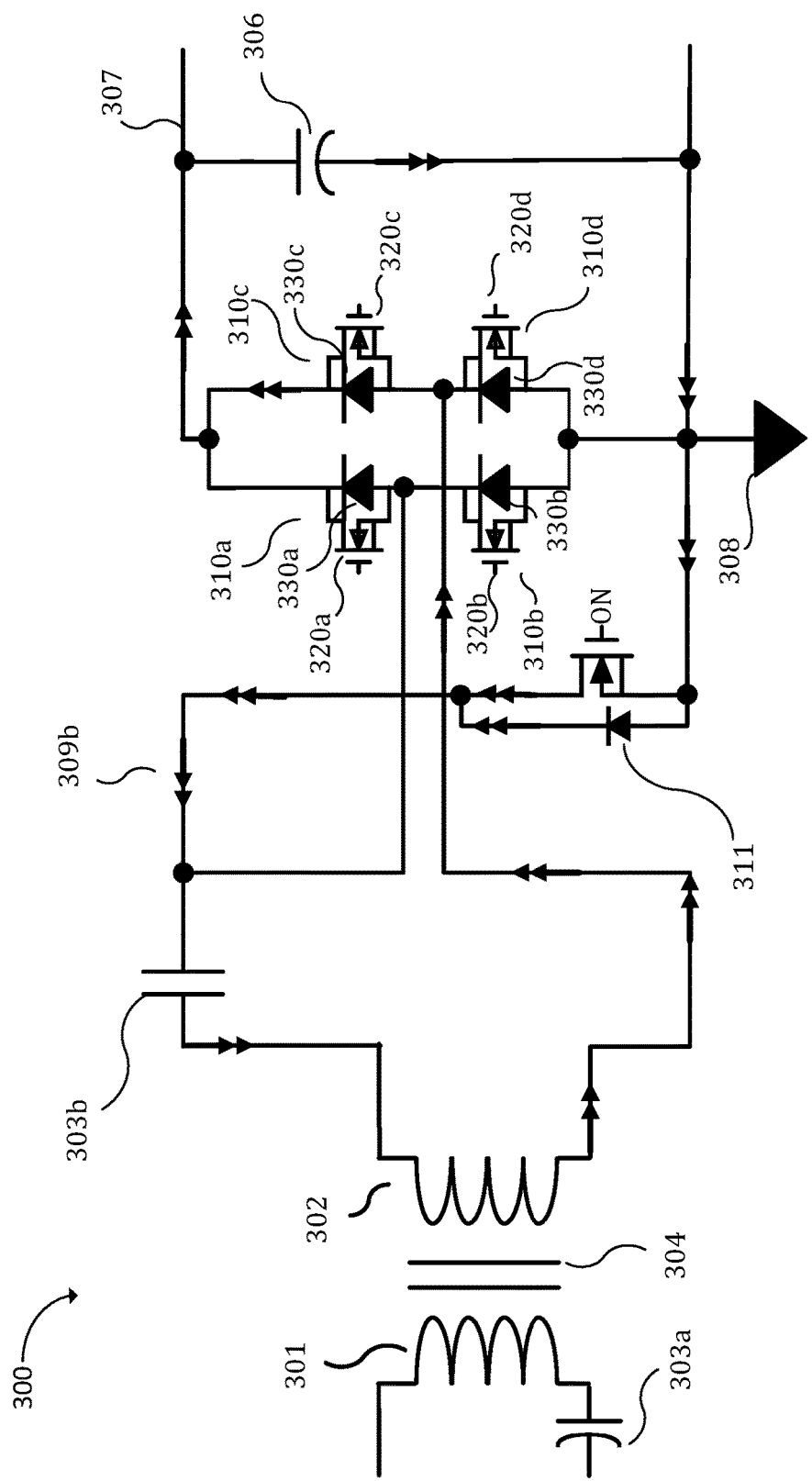
FIG. 3B is a diagram of the power converter of FIG. 3A illustrating a different direction of current flow, according to the invention.

FIG. 3A shows the flow of current 309a (as represented by arrows) when a voltage at an upper end of coil 302 is positive with respect to a lower end of coil 302. FIG. 3B illustrates power converter 300 of FIG. 3A but with the flow of current (as represented by double arrows) 309b in the opposite direction when a voltage at the lower end of coil 302 is positive with respect to its upper end. FIG. 3A illustrates power converter 300 when FET 311 is held ON (conducting) and current 309a flows in a direction from the upper end of second coil 302 towards second capacitor 303b. FIG. 3B illustrates the flow of current 309b (as represented by double arrows) when the voltage across second coil 302 reverses. Voltage across second capacitor 303b adds up in series with the voltage stored in second capacitor 303b, which causes a second output voltage (e.g., 2V), that is substantially double a first output voltage (e.g., V) when FET 311 is held off (see below), to appear on output voltage rail 307. This is a result of charges in second capacitor 303b being repeatedly pumped into larger output capacitor 306. In this manner, second capacitor 303b and FET 311 operate to "pump" larger output capacitor 306. Second capacitor 303b may or may not have a capacitance tuned to resonate with second coil 302.

Figure 3C:
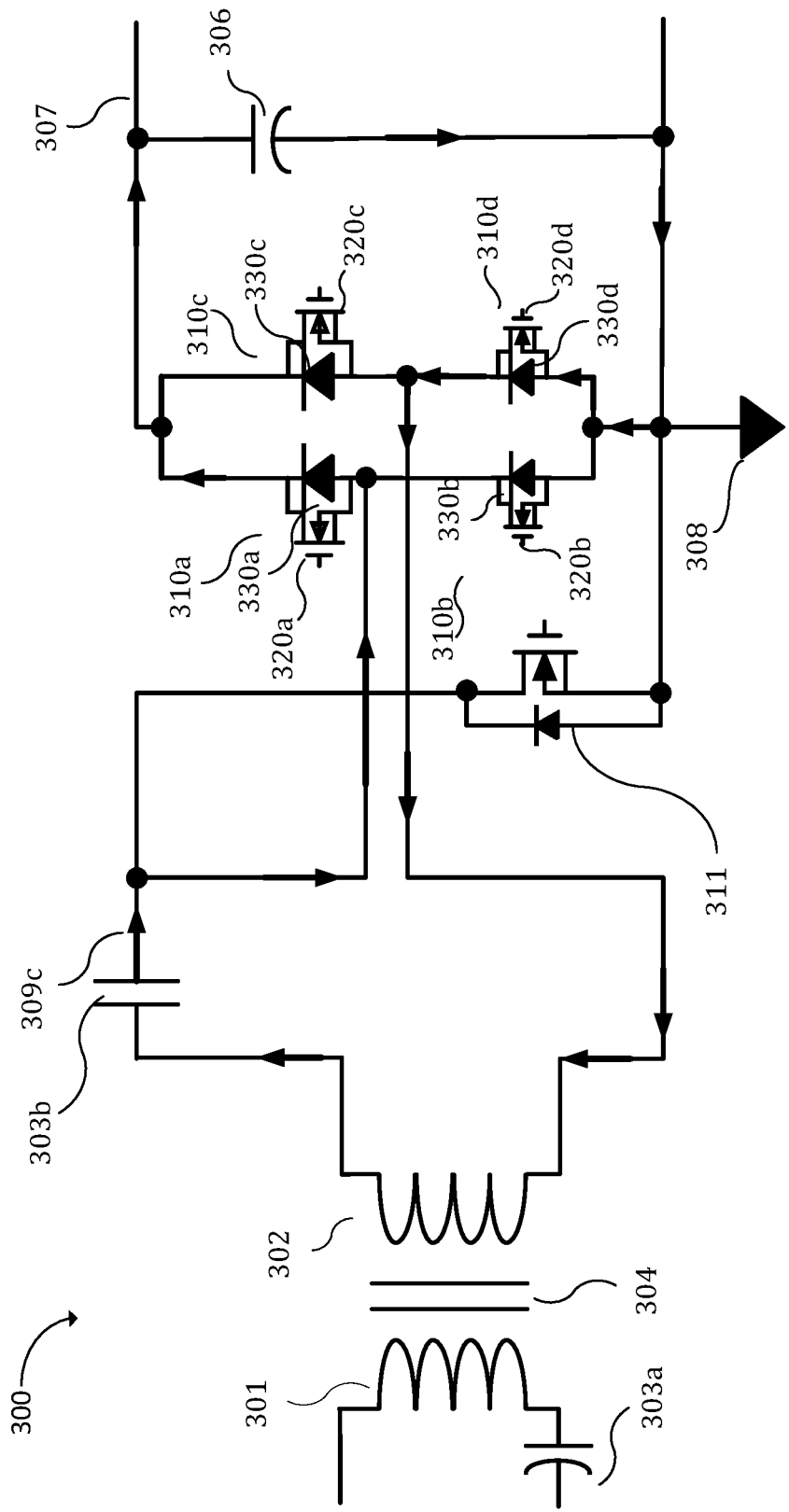
FIG. 3C is a diagram of the power converter of FIG. 3A illustrating a different direction of current flow, according to the invention.
Figure 3D:
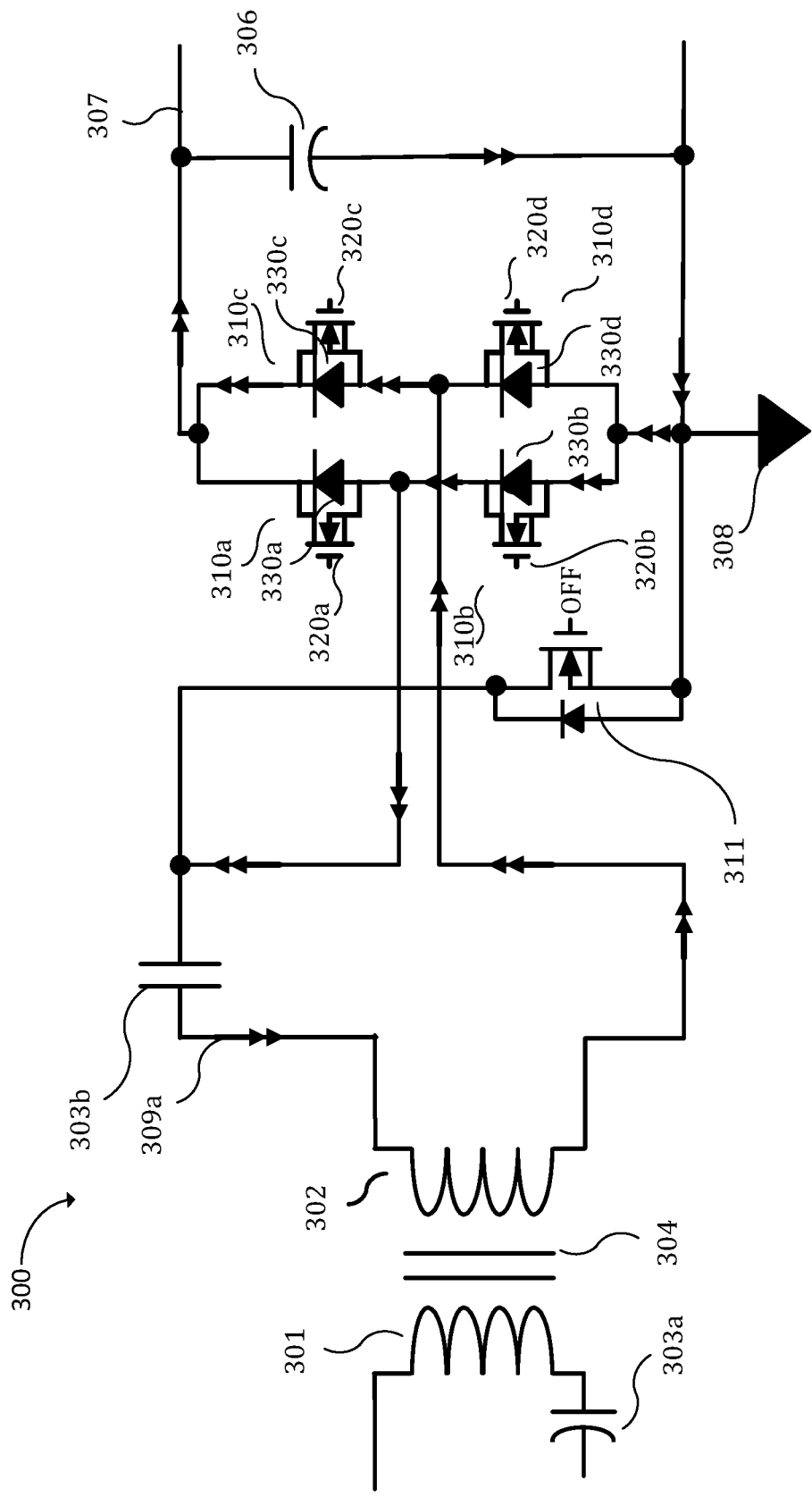
FIG. 3D is a diagram of the power converter of FIG. 3A illustrating a different direction of current flow, according to the invention.

FIG. 3C illustrates power converter 300 as described with regard to FIGS. 3A and 3B but illustrating the direction of current 309c (as represented by arrows) flow when FET 311 is held OFF (non-conducting), which causes the output voltage of power converter 300 to be at the first output voltage (e.g., V) at output voltage rail 307. FIG. 3D illustrates power converter 300 when FET 311 is held firmly OFF (non-conducting) and the direction of current 309d (as represented by double arrows) flows to second capacitor 303b. When FET 311 is OFF, the first output voltage (e.g., V) at output voltage rail 307, which as discussed above, is substantially half the second output voltage (e.g., 2V) at output voltage rail 307, when FET 311 is held on.

Figure 3E:
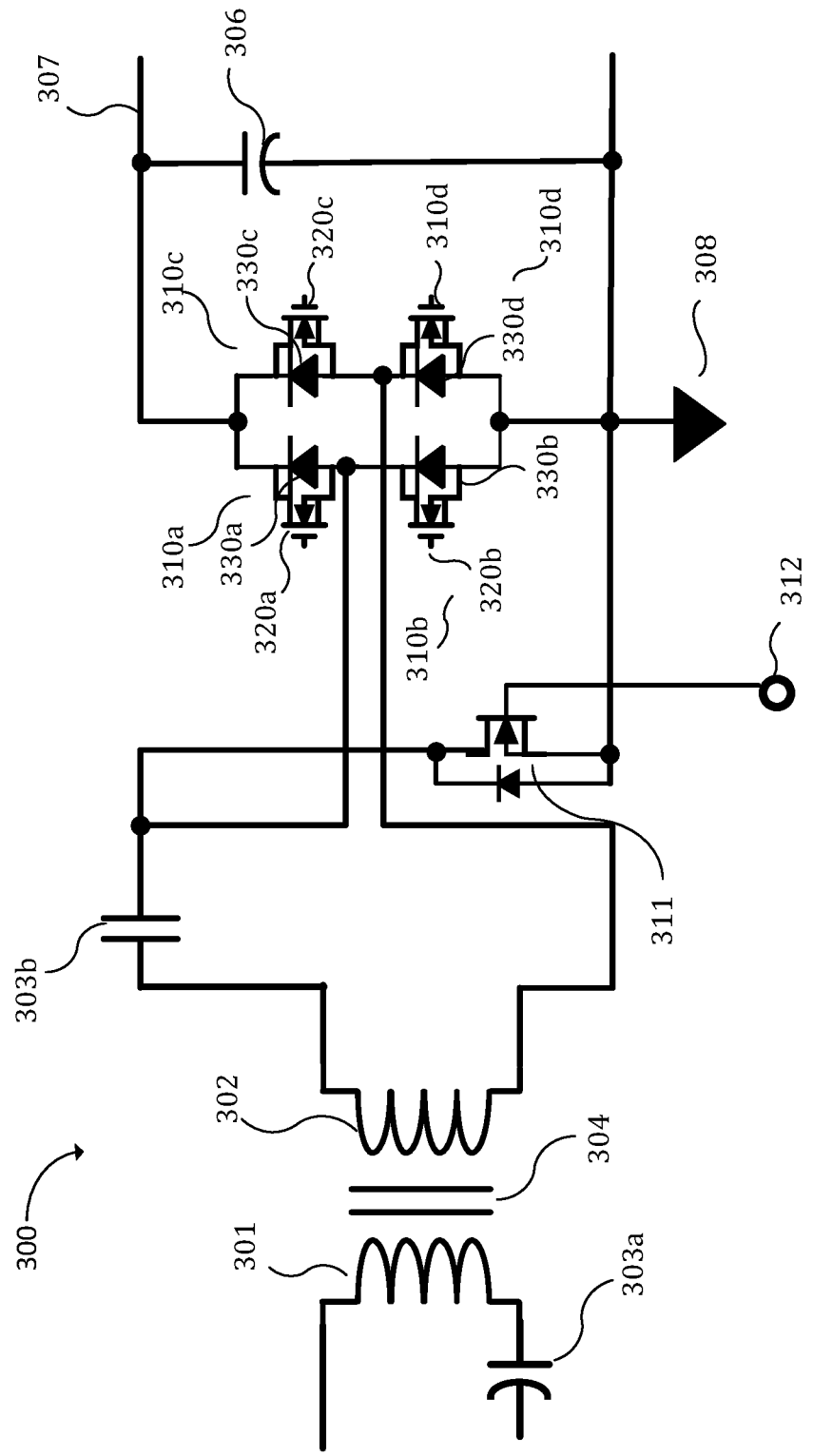
FIG. 3E is a diagram of another embodiment of a power converter with a resonant capacitor and a charge pump, according to the invention.

FIG. 3E shows power converter 300 where a gate 312 of FET 311 is used to repetitively toggle FET 311 on and off according to a certain duty cycle. Toggling FET 311 at a duty cycle causes the output voltage at output voltage rail 307 to become steady at a certain value between a first voltage (e.g., V) and a second voltage that is double the first voltage (e.g., 2V). In other words, the output voltage of power converter 300 is controllable based on the frequency of a duty cycle applied to gate 312 of FET 311. A default value of output voltage for power converter 300 may also be set by turning on FET 311 almost the full duration, and then reducing the duty cycle. This sequence will produce a "buck" or step-down action on the output voltage at output voltage rail 307. Therefore, in this embodiment, power converter 300 may be viewed as having a secondary-side buck stage. In another embodiment, FET 311 may be replaced with a wire link (not shown), which has the same effect as holding FET 311 "ON," and the output voltage of power converter 300 is doubled (e.g., 2V).

Figure 4:
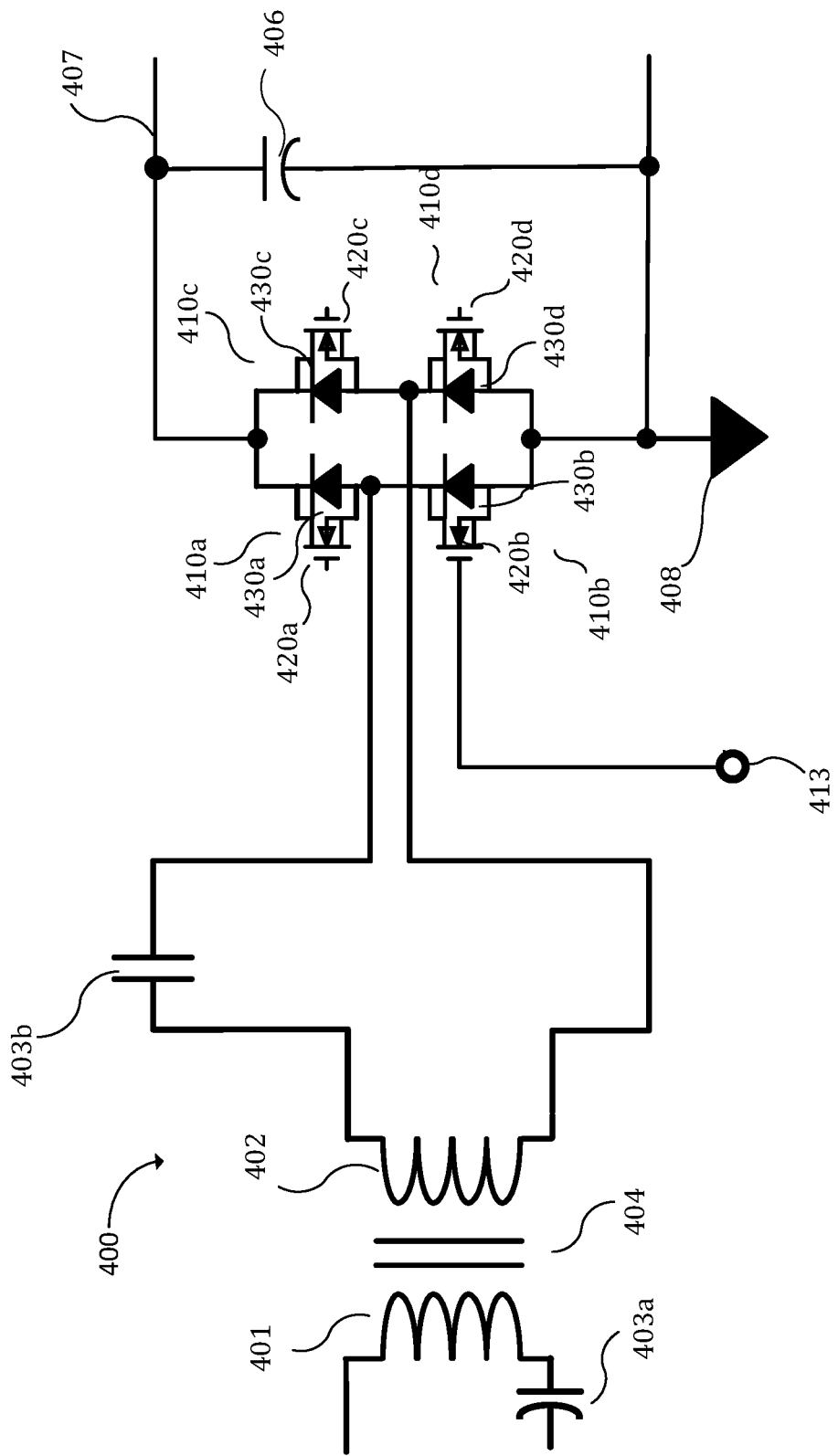
FIG. 4 is a diagram of another embodiment of a power converter with a resonant capacitor and a charge pump, according to the invention.

FIG. 4 shows a power converter 400 according to another embodiment of the invention. FIG. 4 includes a FET 420b having a gate 413 that may be switched ON and OFF (toggled), with an arbitrary frequency and duty cycle (i.e., pulse). In other embodiments, a gate of any of FET 420a, 420c, or 420d can be switched ON and OFF according to the duty cycle. Switching gate 413 will cause a variable output voltage on an output voltage rail 307, varying between a first voltage (e.g., V) and a second voltage level, which is double the first voltage (e.g., 2V). Power converter 400 includes, but is not limited to, a primary side having a first coil 401 and a capacitor 403a, a core 404, and a secondary side having a second coil 402, a second capacitor 403b, an output capacitor 406, an output voltage rail 407, a ground 408, and a first rectifier 410a, a second rectifier 410b, a third rectifier 410c, and a fourth rectifier 410d. First coil 401 may be implemented as a primary-side coil of the true resonant converter, or as a transmitter coil within a wireless power transfer system; the primary side of power converter 400 therefore represents the wireless transmitter when power converter 400 is implemented within a wireless power transfer system. First coil 401 is the primary-side coil of a converter, or the transmitter coil in a wireless power transfer system. Capacitor 403a may be a traditional DC blocking capacitor or a resonant capacitor as described above; in this embodiment capacitor 403a is optional. In this embodiment, the output voltage of power converter 400 is controlled by second capacitor 403b and FET 410b working in combination as a charge pump. Output voltage rail 407 may be controlled by various methods such as, but not limited to, varying the frequency of the applied alternating voltage applied across the combination of first coil 401 and capacitor 403a. Coil 402 may be a secondary-side coil or winding in a resonant or non-resonant power converter, or a receiver coil in a wireless power transfer system. As such, the secondary side of power converter 400 may be implemented as a wireless receiver in a wireless power transfer system.

Core 404 may be a core in a power converter, or air or plastic, in a wireless power transfer system. Output capacitor 406 has a larger capacitance than second capacitor 403b. First rectifier 410a, second rectifier 410b, third rectifier 410c, and fourth rectifier 410d may contain FETs 420a, 420b, 420c, and 420d, respectively, across each diode 430a, 430b, 430c, and 430d, respectively, where the FETs 420a, 420b, 420c, and 420d may be switched synchronously such that each FET is made to conduct only when the diode it is in parallel with conducts, to reduce the dissipation due to the non-zero forward voltage drop of the diodes. Output capacitor 406 filters an output voltage at output voltage rail 407. In this embodiment, second capacitor 403b is mandatory. The combination of FET 420b and second capacitor 403b operate as a charge pump for "charging" output capacitor 406. FET 420b can be ON (conducting) or OFF (non-conducting). Together, capacitor 403b and FET 420b create a boost action to vary or double an output voltage of power converter 400.

Figure 5A:
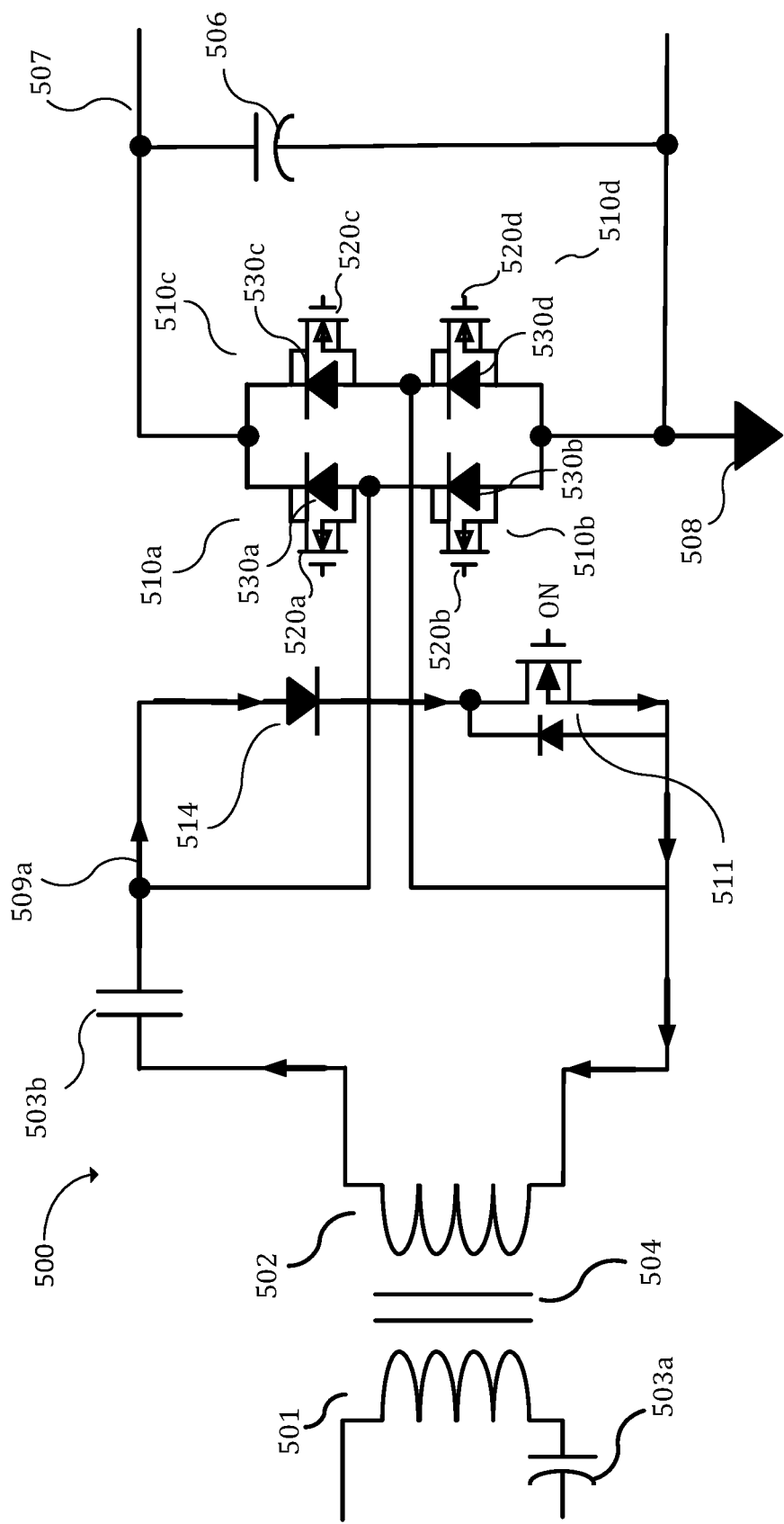
FIG. 5A is a diagram of another embodiment of a power converter with a resonant capacitor, a charge pump, and a direction of current flow, according to the invention.

FIG. 5A shows a power converter 500 according to one embodiment of the invention. Power converter 500 includes, but is not limited to, a primary side having a first coil 501 and a capacitor 503a, a core 504, and a secondary side having a second coil 502, a second capacitor 503b, an output capacitor 506, an output voltage rail 507, a ground 508, and a first rectifier 510a, a second rectifier 510b, a third rectifier 510c, a fourth rectifier 510d, and a FET 511. First coil 501 may be implemented as a primary-side coil of the true resonant converter, or as a transmitter coil within a wireless power transfer system; the primary side of power converter 500 therefore represents the wireless transmitter when power converter 500 is implemented within a wireless power transfer system. First coil 501 is the primary-side coil of a converter, or the transmitter coil in a wireless power transfer system. Capacitor 503a may be a traditional DC blocking capacitor or a resonant capacitor as described above; in this embodiment capacitor 503a is optional. In this embodiment, the output voltage of power converter 300 is controlled by second capacitor 503b and FET 511 working in combination as a charge pump. Output voltage rail 507 may be controlled by various methods such as, but not limited to, varying the frequency of the applied alternating voltage applied across the combination of first coil 501 and capacitor 503a. Coil 502 may be a secondary-side coil or winding in a resonant or non-resonant power converter, or a receiver coil in a wireless power transfer system. As such, the secondary side of power converter 500 may be implemented as a wireless receiver in a wireless power transfer system.

Core 504 may be a core in a power converter, or air or plastic, in a wireless power transfer system. Output capacitor 506 has a larger capacitance than second capacitor 503b. First rectifier 510a, second rectifier 510b, third rectifier 510c, and fourth rectifier 510d may contain FETs 520a, 520b, 520c, and 520d, respectively, across each diode 530a, 530b, 530c, and 530d, respectively, where the FETs 520a, 520b, 520c, and 520d may be switched synchronously such that each FET is made to conduct only when the diode it is in parallel with conducts, to reduce the dissipation due to the non-zero forward voltage drop of the diodes. Output capacitor 506 filters an output voltage at output voltage rail 507. In this embodiment, second capacitor 503b is mandatory. The combination of FET 511 and second capacitor 503b operate as a charge pump for "charging" output capacitor 506. FET 511 can be ON (conducting) or OFF (non-conducting). Together, capacitor 503b and FET 511 create a boost action to vary or double an output voltage of power converter 500. In this embodiment, FET 511 is not connected to ground 508 as in the embodiment shown in FIG. 3A, but instead is connected to the lower end of second coil 502 and an additional diode 514.

Figure 5B:
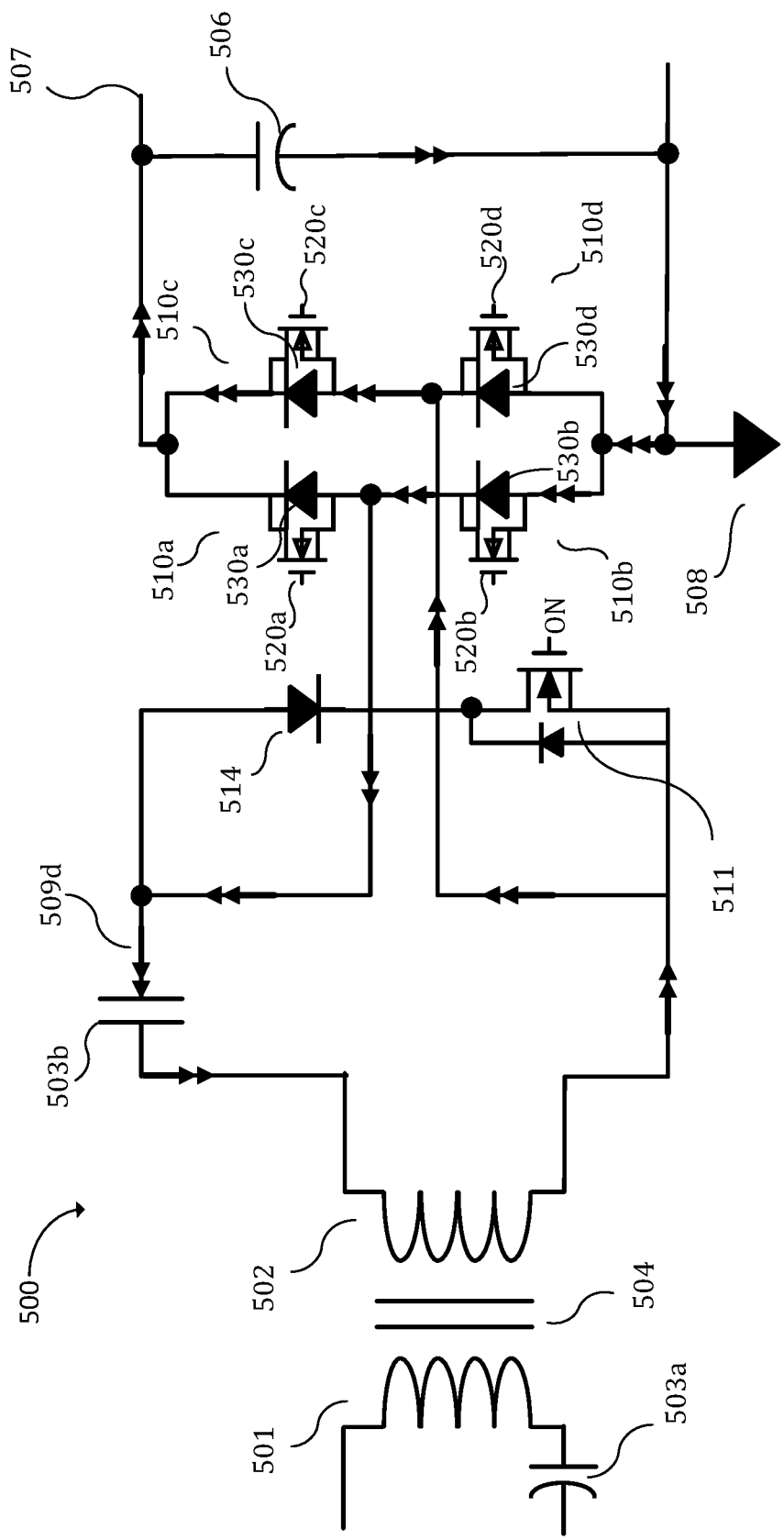
FIG. 5B is a diagram of the power converter of FIG. 5A illustrating a different direction of current flow, according to the invention.

FIG. 5A illustrates the direction of current flow 509a (as represented by arrows) with FET 511 toggled ON. Voltage across second capacitor 503b adds up in series with the voltage stored in second capacitor 503b, which causes a second output voltage (e.g., 2V), that is substantially double a first output voltage (e.g., V) when FET 511 is held off (see below), to appear on output voltage rail 507. This is a result of charges in second capacitor 503b being repeatedly pumped into larger output capacitor 506. In this manner, second capacitor 503b and FET 511 operate to "pump" larger output capacitor 506. Second capacitor 503b may or may not have a capacitance tuned to resonate with second coil 502. FIG. 5B illustrates the same power converter 500 shown in FIG. 5A but having current (as represented by double arrows) 509b with a different direction of current flow when the lower end of second coil 502 goes high with respect to the upper end of second coil 502.

Figure 5C:
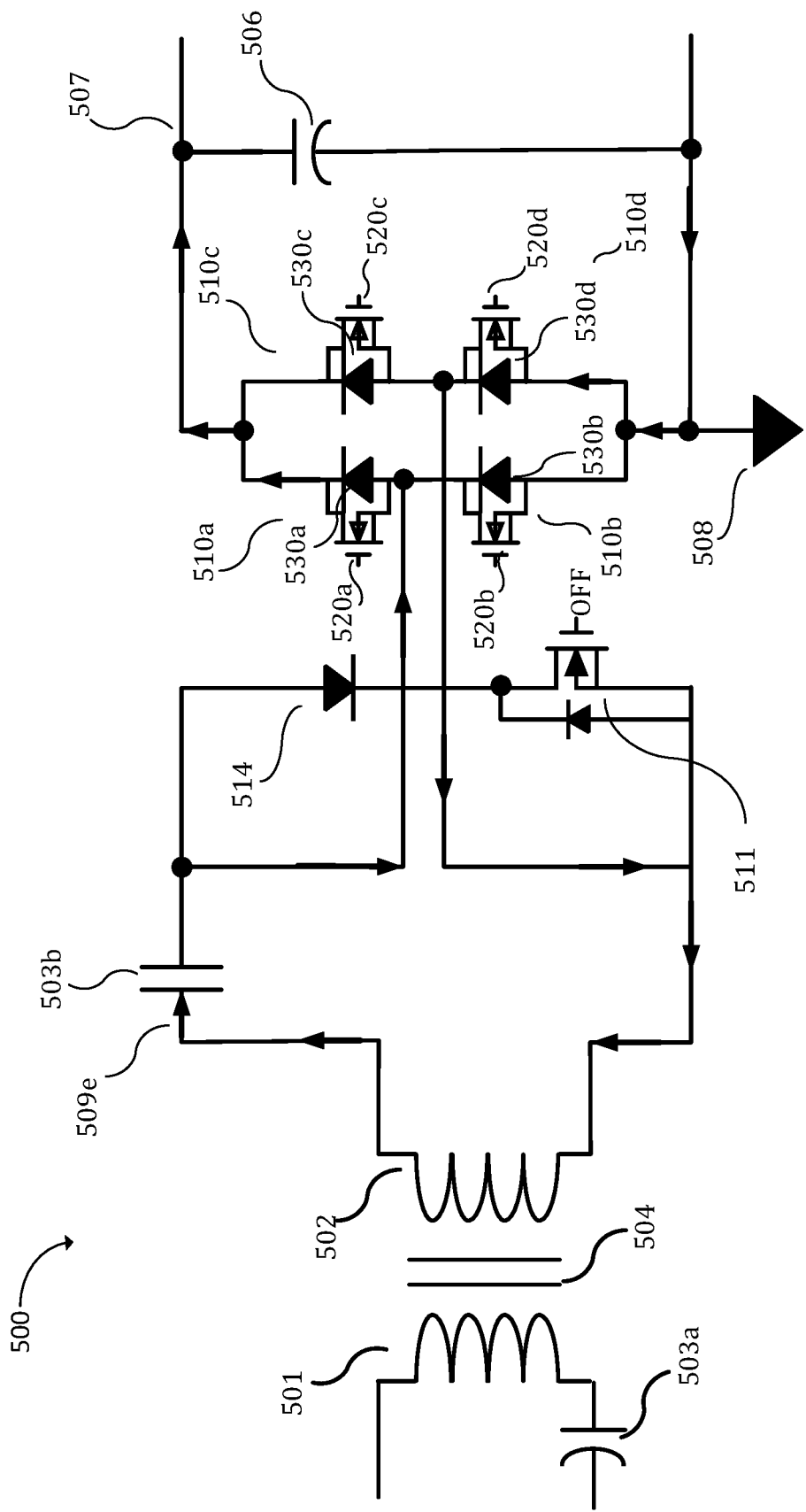
FIG. 5C is a diagram of the power converter of FIG. 5A illustrating a different direction of current flow, according to the invention.
Figure 5D:
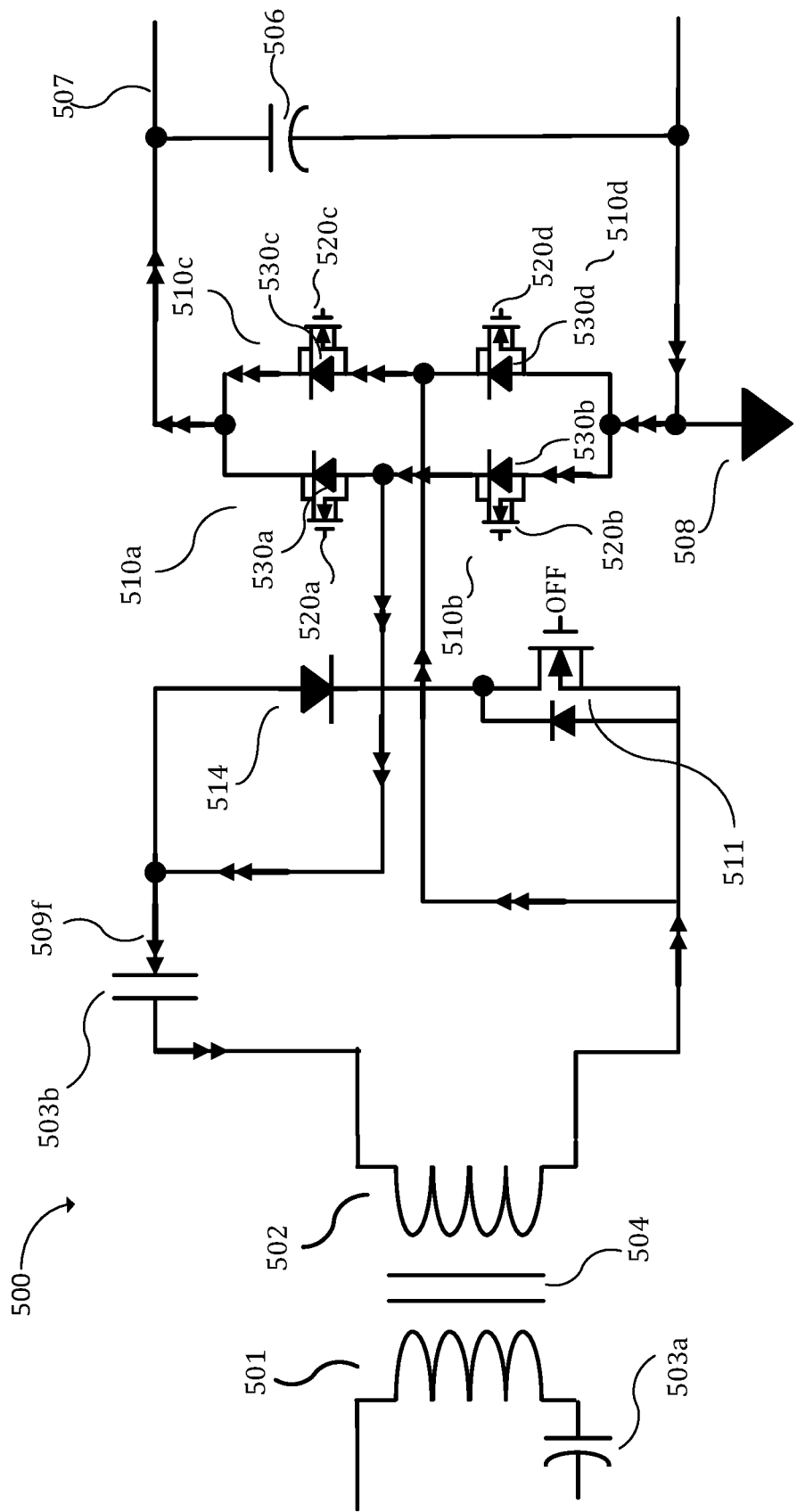
FIG. 5D is a diagram of the power converter of FIG. 5A illustrating a different direction of current flow, according to the invention.

FIG. 5C illustrates power converter 500 of FIG. 5A and the direction of current flow 509c (as represented arrows) with FET 511 held OFF. FIG. 5D illustrates power converter 500 but having current (as represented by double arrows) 509d showing a different direction of current flow when the lower end of second coil 502 goes high with respect to the upper end of second coil 502. When FET 511 is OFF, the first output voltage (e.g., V) at output voltage rail 507, which as discussed above, is substantially half the second output voltage (e.g., 2V) at output voltage rail 507, when FET 511 is held on.

Figure 5E:
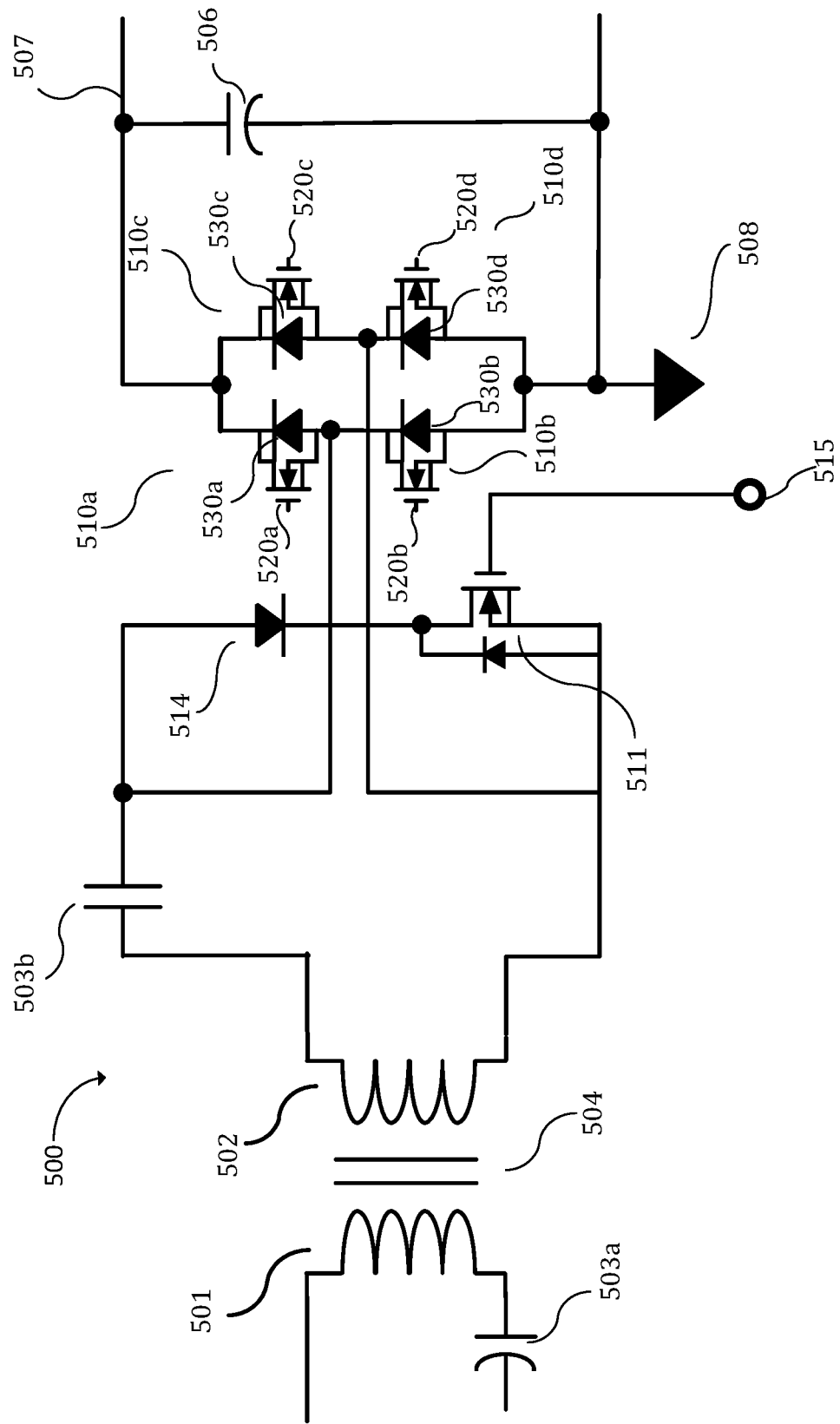
FIG. 5E is a diagram of another embodiment of a power converter with a resonant capacitor and a charge pump, according to the invention.

FIG. 5E illustrates power converter 500 according to another embodiment of this invention having FET 511 connected to the lower end of second coil 502, instead of ground 308. In this embodiment, toggling a gate 515 of FET 511 repetitively with a certain duty cycle may vary the output voltage at output voltage rail 507 between a first voltage (e.g., V) and a second voltage that is double the first voltage (e.g., 2V). If FET 511 is replaced with a link of wire, the output voltage at output voltage rail 507 may be maintained at the second voltage.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A wireless power receiver comprising:
    a coil having a first end and a second end;
    a first capacitor having a first end and a second end, the first end of the first capacitor directly connected to the first end of the coil;
    a field effect transistor (FET) having a first end and a second end, the first end of the FET directly connected to the second end of the first capacitor;
    at least one rectifier coupled to the second end of the first capacitor, wherein the at least one rectifier is independent of the FET and comprises a diode directly connected in parallel with a transistor; and
    a second capacitor coupled to the at least one rectifier, wherein the FET is configured to be switched such that the FET and the first capacitor charge the second capacitor,
    wherein a voltage developed across the second capacitor when the FET is conducting and the coil is reverse biased is substantially twice of a voltage developed across the second capacitor when the FET is non-conducting.

2. The wireless power receiver of claim 1, wherein the FET is configured to be switched at a variable duty cycle such that the second capacitor generates a variable output voltage.

3. The wireless power receiver of claim 2, wherein the FET is configured to be switched according to a first duty cycle such that the second capacitor generates a first output voltage.

4. The wireless power receiver of claim 3, wherein the FET is configured to be switched according to a second duty cycle such that the second capacitor generates a second output voltage, wherein the second output voltage is substantially double the first output voltage.

5. The wireless power receiver of claim 3, wherein the FET is configured to be switched according to a second duty cycle such that the second capacitor generates a second output voltage, wherein the second output voltage is greater than the first output voltage.

6. The wireless power receiver of claim 3, wherein the FET is configured to be switched according to a second duty cycle such that the second capacitor generates a second output voltage, wherein the second output voltage is less than the first output voltage.

7. The wireless power receiver of claim 2, further comprising: a ground, wherein the second end of the FET is directly connected to the ground.

8. A wireless power receiver comprising:
    a coil having a first end and a second end;
    a first capacitor having a first end and a second end, the first end of the first capacitor directly connected to the first end of the coil;
    a diode configured to have a forward bias current flow from a first end and a second end, the first end of the diode directly connected to the second end of the first capacitor;
    a field effect transistor (FET) having a first end and a second end, the first end of the FET directly connected to the second end of the diode and the second end of the FET directly connected to the second end of the coil;
    at least one rectifier coupled to the second end of the first capacitor, wherein the at least one rectifier comprises a diode directly connected in parallel with a transistor; and
    a second capacitor coupled in parallel to the at least one rectifier, wherein the FET is configured to be switched such that the FET and the first capacitor charge the second capacitor,
    wherein a voltage developed across the second capacitor when the FET is conducting and the coil is reverse biased is substantially twice of a voltage developed across the second capacitor when the FET is non-conducting.

9. The wireless power receiver of claim 8, wherein the FET is configured to be switched at a variable duty cycle such that the second capacitor generates a variable output voltage.

10. The wireless power receiver of claim 9, wherein the FET is configured to be switched according to a first duty cycle such that the second capacitor generates a first output voltage.

11. The wireless power receiver of claim 10, wherein the FET is configured to be switched according to a second duty cycle such that the second capacitor generates a second output voltage, wherein the second output voltage is substantially double the first output voltage.

12. The wireless power receiver of claim 10, wherein the FET is configured to be switched according to a second duty cycle such that the second capacitor generates a second output voltage, wherein the second output voltage is greater than the first output voltage.

13. The wireless power receiver of claim 10, wherein the FET is configured to be switched according to a second duty cycle such that the second capacitor generates a second output voltage, wherein the second output voltage is less than the first output voltage.

14. The wireless power receiver of claim 1, wherein the second capacitor has a higher capacitance than that of the first capacitor.

15. The wireless power receiver of claim 8, wherein the second capacitor has a higher capacitance than that of the first capacitor.

16. The wireless power receiver of claim 1 further comprising a full-bridge rectifier, the full-bridge rectifier comprising the at least one rectifier, wherein the full-bridge rectifier is coupled to the second end of the first capacitor.

17. The wireless power receiver of claim 8 further comprising a full-bridge rectifier, the full-bridge rectifier comprising the at least one rectifier, wherein the full-bridge rectifier is coupled to the second end of the first capacitor.

18. The wireless power receiver of claim 1, wherein the at least one rectifier comprises a first rectifier and a second rectifier, wherein the first rectifier and the second rectifier are configured to be switched synchronously.

19. The wireless power receiver of claim 8, wherein the at least one rectifier comprises a first rectifier and a second rectifier, wherein the first rectifier and the second rectifier are configured to be switched synchronously.

* * * * *